United States Patent
Llombart Estopiñan et al.

(10) Patent No.: US 8,604,633 B2
(45) Date of Patent: Dec. 10, 2013

(54) SYSTEM FOR EVALUATING AND CONTROLLING THE EFFICIENCY OF A WIND TURBINE

(75) Inventors: Andrés Llombart Estopiñan, Saragossa (ES); Roberto Gutierrez Ardanaz, Pamplona (ES); Jose Jesus Guerrero Campo, Saragossa (ES); Francisco Javier Beltran Martinez, Saragossa (ES); Jesús Sallan Arasanz, Saragossa (ES); Carlos Pueyo Rufas, Saragossa (ES); Ana Patricia Talayero Navales, Saragossa (ES); Julio Javier Melero Estela, Saragossa (ES); Miguel Garcia Gracia, Saragossa (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 492 days.

(21) Appl. No.: 12/937,406

(22) PCT Filed: Apr. 14, 2009

(86) PCT No.: PCT/ES2009/070099
§ 371 (c)(1),
(2), (4) Date: Oct. 12, 2010

(87) PCT Pub. No.: WO2009/127764
PCT Pub. Date: Oct. 22, 2009

(65) Prior Publication Data
US 2011/0025062 A1    Feb. 3, 2011

(30) Foreign Application Priority Data

Apr. 15, 2008   (ES) .................................. 200801073

(51) Int. Cl.
*F03D 11/00* (2006.01)
*F03D 9/00* (2006.01)

(52) U.S. Cl.
USPC .................................. 290/44; 700/286; 416/1

(58) Field of Classification Search
USPC ................ 290/43, 44, 54, 55; 700/286; 416/1
See application file for complete search history.

(56) References Cited

U.S. PATENT DOCUMENTS 6,850,821 B2 * 2/2005 Weitkamp ..................... 700/286
6,975,925 B1   12/2005 Barnes et al.
(Continued)

OTHER PUBLICATIONS

International Search Report dated Jul. 27, 2009 for Application No. PCT/ES2009/070099.

(Continued)

*Primary Examiner* — Nicholas Ponomarenko
(74) *Attorney, Agent, or Firm* — Ladas & Parry LLP

(57) ABSTRACT

The invention relates to a system for evaluating the efficiency of a wind turbine (3), with a control system comprising means (11, 15) which are used to measure meteorological parameters M1, M2 and are respectively arranged in the wind turbine (3) and in a meteorological tower (5), and means (13) for measuring the orientation β of the wind turbine and the power Pr generated by same. The system according to the invention comprises a computerised unit (21) which is connected to said measuring means (11, 13, 15) and provided with a first calculating module (23) designed to obtain a characteristic power Pc as a function of said parameters from the data obtained during a first operating step, and a second calculating module (25) designed to obtain the mean deviation Dm between the power Pr actually generated and the characteristic power Pc according to the function obtained by the first calculating means (23) in the set of at least one series of data.

9 Claims, 2 Drawing Sheets

(56) References Cited

U.S. PATENT DOCUMENTS

| | | | |
|---|---|---|---|
| 7,403,854 B1 * | 7/2008 | Hurley et al. | 702/3 |
| 7,420,289 B2 * | 9/2008 | Wang et al. | 290/44 |
| 7,822,582 B2 * | 10/2010 | Mertins et al. | 703/1 |
| 7,874,797 B2 * | 1/2011 | Pierce et al. | 416/1 |
| 7,908,035 B2 * | 3/2011 | Kumar et al. | 700/286 |
| 2006/0173623 A1 | 8/2006 | Grzych et al. | |

OTHER PUBLICATIONS

International Preliminary Report on Patentability dated Dec. 6, 2010 for Application No. PCT/ES2009/070099.

Cabezon, Daniel, et al., "Comparison of Methods for power Curve Modeling", Global Windpower, Mar. 31, 2004, pp. 1-9.

Giebel, Gregor, "the State-Of-The-Art in Short-Term Prediction of Wind Power, A Literature Overview", Version 1.1, Project Anemos, 2003, pp. 1-36.

Kariniotakis, George N, "Uncertainty of Short-term Wind Power Forecasts- a Methodology for On-line Assessment", International Conference on Probalistic Meth ods Applied to Power Systems, Sep. 12-16, 2004, pp. 729-734.

* cited by examiner

SYSTEM FOR EVALUATING AND CONTROLLING THE EFFICIENCY OF A WIND TURBINE

FIELD OF THE INVENTION

This invention refers to a system for the evaluation and control of the output of wind turbines in a wind farm, with a view to optimising the energy production that can be obtained from each of them.

BACKGROUND TO THE INVENTION

The analysis of the output of a wind turbine involves knowing with exactitude the density of the air, the velocity and other characteristics of the fluid current which falls upon its rotor. However, the data concerning the velocity and characteristics of the wind falling upon the blades are impossible to measure with exactitude, so we have to work with various estimation methods to obtain the relationship between the power produced by the wind turbine and the wind falling on the blades.

The validity of the methods presented within a scientific context has not been proven in the case where the meteorological tower is located some distance from the wind turbines. Further, several meteorological towers are used to control the production of a relatively small number of wind turbines as 7 wind turbines.

The latest method developed for this task is that patented by MADE Tecnologías Renovables Patent No. ES2198212; Method for the control of production in electric wind turbines. Inventors: M. Sanz-Badía, F. J. Val, A. Llombart. This method has succeeded in detecting anomalies of some 2% if maintained during a period of at least 8 weeks, but suffers from a number of disadvantages such as:

- It characterises the production of all the wind turbines in a wind farm via the velocity and wind direction data from a meteorological mast, which does not represent the wind actually falling on a wind turbine since the mast could be located some considerable distance from the machines.
- It does not take into account the possible effects of the standard deviation in the wind speed or relative humidity.
- It does not provide an estimate of the wind turbine output.
- The division into sectors (depending on the direction) in a narrow and fixed form (each preferably 5°) means that many of the sectors cannot be characterised.
- The maximum error which it has been possible to detect is some 2%.
- The wind turbine characterisation process is not automatic.

This invention is intended to resolve these issues.

SUMMARY OF THE INVENTION

The aim of this invention is to provide an automated system for the evaluation and control of the production of the wind turbines in a wind farm which enables the efficient detection of any anomalous deviation of the power produced by a wind turbine so that appropriate measures can be taken to minimise possible losses in production due to unavailability and to keep the operating characteristics of the wind turbines within an optimal range.

Another aim of this invention is to provide an automated system for the evaluation and control of the production of the wind turbines in a wind farm which enables instructions to be provided automatically to the control system of the wind turbine to change its operation as a consequence of the detection of a major anomalous deviation in the power produced by the wind turbine.

These and other aims are achieved by providing a system of evaluation and control of the output of a wind turbine located in a wind farm which comprises:

- A first set of means of measurement for meteorological parameters M1 located in the wind turbine.
- A second set of means of measurement for the direction of the orientation $\beta$ of the wind turbine and of the power Pr actually produced by the wind turbine.
- A 3rd set of means of measurement for meteorological parameters M2 in a meteorological tower located within the above-mentioned wind farm.
- A computerised unit connected to the above-mentioned first, second and third means of measurement, which includes:
  - a first calculation module which obtains the characteristic power Pc of the wind turbine as a function of at least the meteorological parameters M1 and M2 and the direction of the orientation $\beta$ of the wind turbine based on the data provided periodically by the above-mentioned first, second and third means of measurement during a first stage of functioning of the wind turbine;
  - a second calculation module which based on data provided periodically by the above-mentioned first, second and third means of measurement during the normal operation of the wind turbine obtains the mean deviation Dm that exists between the power Pr actually produced by the wind turbine and the characteristic power Pc corresponding to the values of the parameters M1 and M2 and the direction of the orientation $\beta$ of the wind turbine provided jointly with the value of the power Pr, applying the function obtained with the first calculation module, in the set of one or more data series corresponding to a predetermined number of periods.

In a preferred embodiment of this invention the meteorological parameters M1 comprise at least the velocity v and direction $\alpha$ of the wind and/or statistical parameters derived from them and the meteorological parameters M2 comprise at least the pressure Pa, the temperature T and the relative humidity of the air Hr and/or statistical parameters derived from them. We achieve thereby, on the one hand, a system for the evaluation and control of the output of a wind turbine which makes it possible to use the anemometer and the vane located in the nacelle of the wind turbine upon adequately taking into account the perturbations introduced by the wind turbine into the measurements provided by those instruments and, on the other hand, a system for the evaluation and control of the output of a wind turbine which enables the automatic evaluation of production by means of the numerical estimation of the output of the wind turbine.

In another preferred embodiment of this invention the above-mentioned second calculation module includes a sub-module connected to the control system of the wind turbine to transmit to it directly instructions to be executed by the above-mentioned control system in the event that the mean deviation Dm of one of the above-mentioned series exceeds some pre-established thresholds. We thereby achieve a system for the evaluation and control of the output of a wind turbine with direct means of communication with the control system which enables immediate action to be taken should any circumstances arise which cause a particularly anomalous deviation in the output of the wind turbine.

In another preferred embodiment of this invention the above-mentioned first set of means of measurement, which are, typically, an anemometer and a vane located in the wind turbine nacelle, are duplicated there being then both principal means and auxiliary means and the above-mentioned second calculation module comprises additional means of calculation to obtain the above-mentioned mean deviation Dm based on the data provided by the meteorological parameters M1 from both the above-mentioned principal means and the above-mentioned auxiliary means for the purpose of detecting any failures in these on obtaining discrepancies between results. We achieve thereby a system for the evaluation and control of the output of a wind turbine which enables automatic detection of any failure in any of the above-mentioned duplicated means of measurement and, in such case, instruct the control system to use the data provided from the other means.

Other characteristics and advantages of this invention may be seen from the detailed description which follows in relation to the accompanying figures.

DESCRIPTION OF THE DRAWINGS

To complement the description given here and with the aim of helping to achieve a better understanding of the characteristics of the invention, on the basis of a preferred example of the practical embodiment of the invention, as an integral part of this description there is attached a set of drawings in which, for illustrative but not restrictive purposes, the following is shown.

PREFERRED EMBODIMENT OF THE INVENTION

As is well known the control system of a wind turbine operates generally at two levels. At the first level, the control system uses meteorological parameter data obtained via the appropriate means of measurement such as, for example, wind velocity and takes the measures necessary to arrange that the operation of the wind turbine reflects the relevant meteorological conditions and supplies the power required in those working conditions such as, for example, a change in the angle of pitch of the blades or a change in the orientation of the nacelle. On the other hand, at the second level, the wind turbine's control system controls the wind turbine's connection to the electricity network both in relation to connection and disconnection operations and in relation to the generation of energy and the quality of the energy supplied to the network, for which purpose it uses data provided by internal means of measurement such as, for example, the instantaneous power produced by the generator or the latter's RPM.

Figure 1:
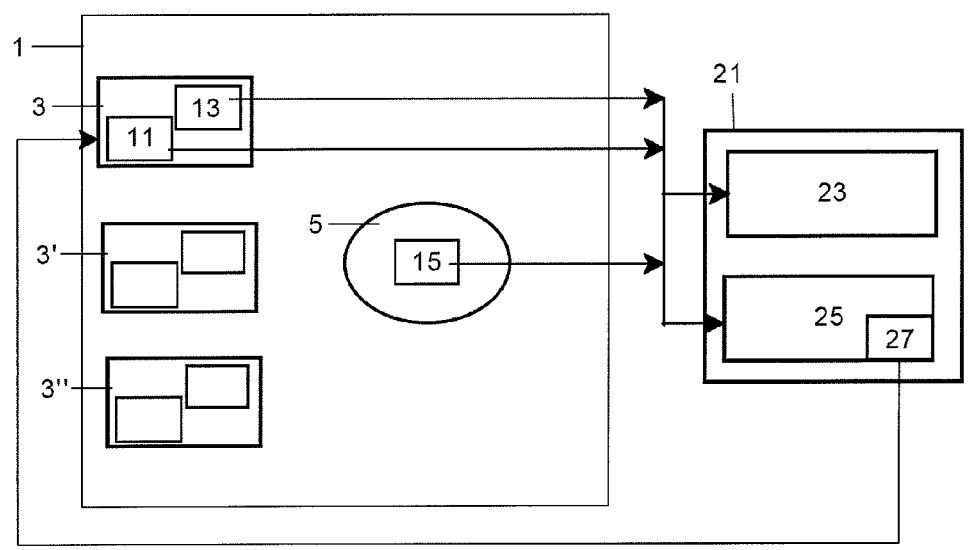
FIG. 1 is a block diagram of the system for evaluation and control of wind turbines in accordance with this invention.
Figures 2, 3:
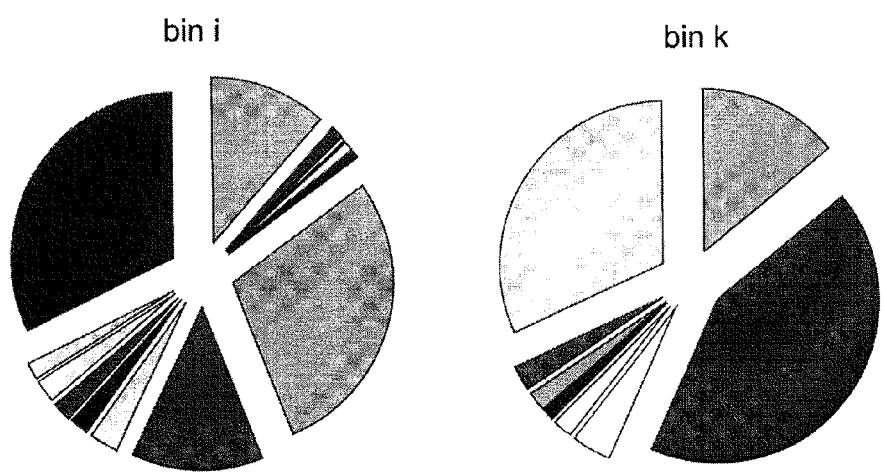
FIGS. 2 and 3 each show schematic representations of the result of grouping the direction data for any two bins (i and k). From these we can observe that, in general terms, the partition will not be uniform; the narrowest sectors being in the principal wind directions and the wider ones in the directions with lower frequency.

Wind turbine 3 illustrated in FIG. 1 to which this invention relates, likewise, wind turbines (3', 3") which are located in the same wind farm (1), have on the one hand some means of measurement (11) of meteorological parameters located in the wind turbine itself, in particular, an anemometer and a vane to measure wind direction and velocity and, on the other hand, some means of measurement (13) of the direction of the orientation of the nacelle and of the power produced by the wind turbine. Obviously the wind turbine (3) has other means of measurement but the ones mentioned are those used in the system object of this invention. As we have said, these means of measurement (11, 13) are connected to the control system of the wind turbine (3).

For its part, the meteorological tower (5) of the farm (1) which services wind turbines (3, 3', 3") has some means of measurement (15) of meteorological parameters other than wind velocity and direction, in particular air pressure, temperature and relative humidity. These means of measurement (15) may or may not be connected to the control system of the wind turbine.

The system for the evaluation and control of the output of a wind turbine (3) in accordance with this invention comprises an evaluation unit (21) connected to the above-mentioned means of measurement (11, 13, 15) with two calculation modules (23 and 25) implemented in a computer is described below, including but not limited to some tables of real data obtained by applying the method to a GAMESA G58 wind turbine.

First Calculation Module 23

Figures 4, 5:
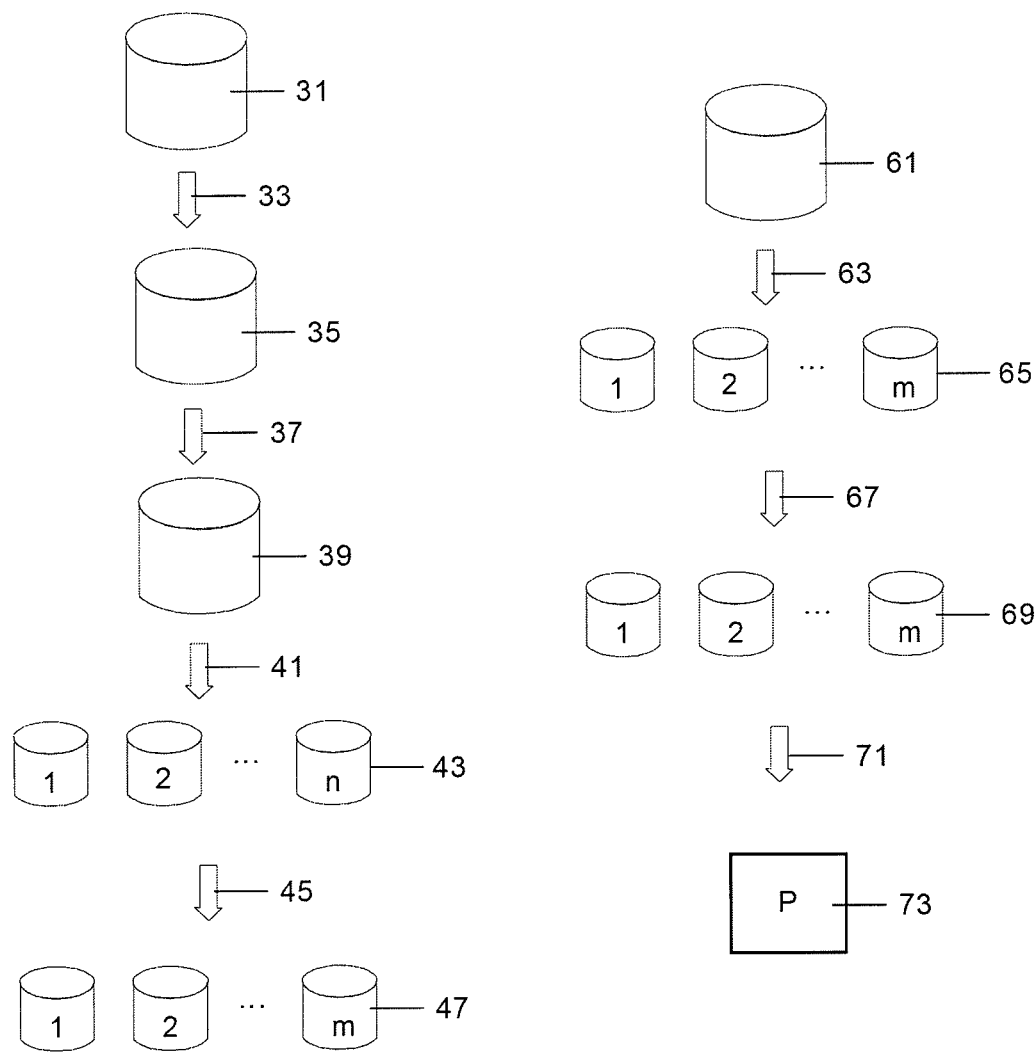
FIG. 4 shows in a schematic manner the process of characterising the operation of a wind turbine. Starting from the raw historic data a filtering of data is carried out to obtain filtered historic data. Subsequently, this data is divided into n subgroups depending on the meteorological variables. These subgroups are grouped following the rules set out in the previous section forming m data groups, in such manner that the set of functions $f_{g-j}$ which relate power and the meteorological parameters for each data group characterise the operation of the wind turbine.
FIG. 5 shows the process of determining the output of a wind turbine for a given temporal framework. Starting with the data available in the framework and considering which data are valid. The data are associated depending on the control group to which they belong. For each set of data, the characterisation function $f_{g-j}$ is used as a basis, and, based on calibration techniques, the output for the wind turbine is obtained.

The first calculation module (23) obtains the characteristic power Pc of the wind turbine during the first stage of operation of the wind turbine, as described below following FIG. 4.

The characterisation of the operation of the wind turbine enables perturbation from the rotor and the nacelle to be mitigated during the collection of wind data in the wind turbine nacelle and, therefore, enables to obtain a precise relationship between the power produced by the wind turbine and the meteorological variables. This process consists of the following steps:

a) Filtering (33) of the original data (31) upon which the characterisation process is based.

Preferably starting with the following original data (31):

P: power produced by the wind turbine.

v: modulus of the wind velocity, measured in the wind turbine nacelle.

$\sigma_v$: standard deviation of the wind velocity.

α: horizontal wind direction measured in the wind turbine nacelle

β: direction of orientation of the wind turbine nacelle

Pa: air pressure measured in the meteorological tower

T: air temperature measured in the meteorological tower

Hr: Relative humidity measured in the meteorological tower

All of this data refer to measurements taken, preferably, every 10 minutes except obviously the standard deviation, which corresponds to the standard deviation of the samples taken into account for the measurement of the wind velocity. The preferred data sampling method is that set out in standard IEC 61400-12.

In this step the quality of the data recorded is checked discarding statistical anomalies corresponding to data capture errors or the incorrect functioning of any of the components of the system. The filtering techniques used will be those typical used in the wind power sector, as well as the robust filtering technique.

b) Normalisation (37) of the data (35) on power and wind velocity obtained in the previous step as a function of density. For this purpose, preferably, the method proposed in standard IEC 61400-12 will be used. To simplify the presentation, in the description the term power Pr actually produced must be understood as power actually produced and corrected as a function of density.

c) Grouping (41) of the data (39) as a function of the wind velocity and direction obtained in the previous step forming subgroups (43) with a small number of data points to allow a precise statistical characterisation, obtaining for each subgroup a function of the type $P=f_{s-i}$ (meteorological parameters, β) which best fits the data for each subgroup and normalising the power data for each subgroup to the central point thereof using, for each data subgroup (i), the function mentioned and obtaining the statistical functions which best represent the variability of the normalised data corresponding to each subgroup.

As the relationship between the free wind (upstream from the wind turbine) and the wind recorded in the nacelle depends on the orography, the relationship between the power and the parameters which define the wind varies with the direction of the latter. Accordingly it would seem reasonable to obtain a characterisation of the power for the narrowest sectors possible (such as for example 5°). However, this method has the problem that many sectors remain to be defined due to lack of data. For this reason a method of grouping data has been developed so as to minimise those areas for which there is no characterisation curve.

The grouping of data as a function of wind velocity is carried out, preferably, using the method of bins (IEC 61400-12) and following this they are grouped as a function of direction in such manner that in each final subgroup there are between 10 and 30 data points and/or that the width in degrees of the resulting set is at least 4°, with the aim of having small subgroups with a sufficiently big number of data to be able to calibrate a function with precision. They are obtained n data subgroups.

For each subgroup (i of n) an adjustment function will be obtained, preferably based on least squares, of the form: $P_i=f$ (v, $\sigma_v$, α, β, P, T, Hr). Using this function all the power data will be normalised to the central point of each subgroup, in such manner that from this normalisation the variability of the various data points with respect to the central point can be obtained. This variability is characterised, preferably, by means of a normal distribution function.

Table 1 shows an example of the data obtained in this step for the 8 m/s velocity bin, that is to say for data obtained with velocities falling between 7.75 and 8.25 m/s.

TABLE 1

| Sec | N | $P_{mi}$ [kW] | $V_m$ [m/s] | $\sigma_v$ [m/s] | α [°] | β [°] | Pa [mmHg] | T (° K) | $H_r$ [%] |
|---|---|---|---|---|---|---|---|---|---|
| 1 | 169 | 410.31 | 8.05 | 1.08 | 1.25 | 1.38 | 831.00 | 274.97 | 71.84 |
| 2 | 37 | 413.60 | 8.04 | 1.57 | 2.16 | 6.38 | 840.77 | 279.55 | 77.48 |
| 3 | 16 | 424.90 | 8.11 | 1.72 | 2.13 | 10.88 | 832.65 | 273.66 | 75.45 |
| 4 | 18 | 440.59 | 7.97 | 1.16 | −0.30 | 16.73 | 834.67 | 279.00 | 76.13 |
| 5 | 10 | 410.75 | 7.96 | 1.13 | 0.62 | 22.25 | 832.95 | 280.53 | 48.97 |
| 6 | 10 | 400.50 | 7.98 | 0.89 | −0.98 | 29.13 | 838.69 | 288.41 | 74.46 |
| ... | | | | | | | | | |
| 25 | 15 | 392.26 | 8.01 | 0.98 | 1.00 | 139.45 | 827.43 | 280.87 | 71.84 |
| 26 | 6 | 376.00 | 8.02 | 1.12 | 2.53 | 143.51 | 824.47 | 278.70 | 80.55 |
| 27 | 80 | 400.45 | 8.01 | 1.16 | 1.62 | 149.92 | 817.68 | 277.60 | 82.74 |
| 28 | 56 | 439.61 | 8.01 | 1.22 | −1.01 | 154.53 | 820.00 | 277.17 | 80.55 |
| 29 | 54 | 434.24 | 8.01 | 1.45 | −1.27 | 158.85 | 822.51 | 277.09 | 79.90 |
| 30 | 135 | 434.18 | 8.01 | 1.45 | 1.11 | 163.37 | 827.83 | 276.95 | 78.68 |
| 31 | 122 | 472.14 | 8.01 | 1.57 | 0.83 | 167.79 | 825.08 | 275.74 | 77.63 |
| 32 | 174 | 451.53 | 8.01 | 1.19 | 0.66 | 172.65 | 825.80 | 276.30 | 77.54 |
| ... | | | | | | | | | |
| 69 | 344 | 444.24 | 7.97 | 0.88 | 0.63 | 351.43 | 831.11 | 275.68 | 77.31 |
| 70 | 251 | 466.93 | 8.01 | 0.90 | 0.93 | 358.28 | 828.06 | 274.02 | 77.00 |

| Sec | $P_{mr}$ [kW] | $D_m$ [%] |
|---|---|---|
| 1 | 446.38 | 2.92% |
| 2 | 442.93 | 2.12% |
| 3 | 438.60 | 1.13% |
| 4 | 444.67 | 2.53% |
| 5 | 426.98 | −1.55% |
| 6 | 423.88 | −2.27% |
| ... | | |
| 25 | 423.95 | −2.25% |
| 26 | 438.25 | 1.05% |
| 27 | 422.52 | −2.58% |
| 28 | 442.33 | 1.99% |
| 29 | 443.26 | 2.20% |
| 30 | 428.21 | −1.27% |
| 31 | 445.12 | 2.63% |

TABLE 1-continued

| | | |
|---|---|---|
| 32 | 442.17 | 1.95% |
| ... | | |
| 69 | 425.21 | −1.96% |
| 70 | 428.31 | −1.25% |

Each of the rows in the first part of Table 1 shows for each of the 70 sectors of direction (Sec) considered the result of grouping the number of data points (n) which were obtained for the variables indicated following the methodology described.

Each of the rows in the second part of Table 1 shows for each of the 70 sectors of direction the actual mean power produced ($P_{mr}$) and the deviation from the mean ($D_m$)

d) Grouping (45) of the data subgroups for each bin obtained in the previous step so that the final groups (47) are homogeneous and precisely defined and obtaining for each group of data (47) a function of the type $P=f_{g-j}$ (meteorological parameters, β) which best fits the group data.

This step results in groups of data which, in general, can be discontinuous in direction. That is, a group of data could be formed for example from subgroups 1, 4, 8 and 10 of bin i.

The obtaining of the statistical functions which characterise the variability of the production data allows to group the distinct subgroups into larger groups (47) each being the union of subgroups with similar characteristics. For this purpose in step (45) those subgroups which have a mean power within +/− 10% are grouped so that the resulting groups have between 30 and 100 data points and the width in degrees of the sector is greater than 8° provided that the standard deviation of the resulting group is no more than double the minimum standard deviation of the subgroups from which the group has been formed, obtaining m groups of data where m<n. Finally, for each group of data (j of m) we calculate an adjustment function $f_{g-j}$ of the type mentioned above.

Table 2 shows how the data points in Table 1 are grouped.

TABLE 2

| Grouping | Direction sectors |
|---|---|
| A1 | 1, 47 |
| A2 | 4, 31, 46 |
| A3 | 2, 29, 33, 54, 55 |
| A4 | 28, 32, 34, 35, 51, 53 |
| ... | |
| A10 | 7, 8, 9, 41, 68, 69 |
| A11 | 6, 23, 24, 25, 39 |
| A12 | 27, 40 |

At the time that a wind farm is installed there are no production data available for any of its wind turbines, so it is impossible to characterise them in the manner which has been explained. As historical data starts to become available characterisation tests can start to be carried out. This process becomes more accurate as more data becomes available, but, on the other hand, the greater the amount of data is used the more the time is required for the process.

A criterion which allows, automatically, determining at what point a wind turbine can be regarded as being characterised with adequate precision is needed.

An ideal situation would be the one in which each data item introduced into the control system in the range of production velocities (generally between 4 and 25 m/s) belonged to a control group. To achieve this the learning period would tend to infinity since, for each wind farm, there are wind directions with very low probability which makes it very difficult to achieve at least 10 data points for every velocity interval.

To determine the time at which the characterisation process has ended the following steps are necessary:

a) Calculation of the probability that any data item entering into the control system belongs to the control groups.

First of all, the calculation of the relative frequencies of each group based preferably on the historical data from the period of performance evaluation of the wind farm is proposed. Once the relative frequencies for each group are obtained, the probability that a data item entering into the system belongs to a control group will be given by the sum of the relative frequencies of the various control groups which have been formed up to the time of the calculation. Relative frequency it meant as the quotient between the number of data items which belong to a particular group for the period of study and the total number of data items taken over the same period.

b) Calculation of the maximum probability that a data item belongs to a control group.

The method must take into account that wind velocities which are too high or too low do not give rise to power production, hence the maximum probability which can be aspired to is the sum of the relative frequencies for all the sectors contained within the maximum and minimum velocities for power production, corresponding to the starting and stopping velocities for the wind turbine.

c) Determination of the moment that the characterisation has concluded.

For the calculation of the degree of learning, in the first instance, the parameter Fp=probability of belonging/maximum probability of belonging must be calculated.

The probability of belonging is understood to mean the sum of the relative frequencies for each control group which has been formed by the time at which it is being verified whether the wind turbine is characterised.

On the other hand, the value we require for this parameter must be decided. To this end it is considered that a value for the parameter Fp between 0.55 and 0.95 can be taken. Accordingly, when this value is reached it can be concluded that the characterisation has been successful.

Table 3 illustrates the dynamics of the characterisation process from which it can be deduced that it can be regarded as concluded once 40,000 data items had been processed since there would be an accumulated probability of 58.06% that it would be within the indicated range.

TABLE 3

| Data | Number of groupings characterised | Number of control groupings | Accumulated probability (Fp) |
|---|---|---|---|
| 10000 | 16 | 16 | 11.48% |
| 20000 | 37 | 35 | 22.95% |
| 30000 | 74 | 67 | 37.57% |
| 40000 | 112 | 98 | 58.06% |
| 50000 | 124 | 108 | 61.71% |

The final result obtained with the first calculation module (23) is, in short, a function which allows to obtain the characteristic power Pc of the wind turbine in question in particular meteorological conditions, that is the power which the wind turbine would be expected to produce in those same meteorological conditions and which serves as a benchmark for the evaluation of the operation of the wind turbine.

Second Calculation Module 25

The second calculation module (25) obtains first and foremost the actual power produced Pr over predetermined time periods as described below following FIG. 5. This process consists of the following steps:

a) Collection of data

Once the relationship between the power generated by the wind turbine and the other variables taken into account for each of the subgroups is known a continuously data collect while the wind turbine is in operation is proceeded to. From among the data items collected those in which the operation of the wind turbine has not been subject to any incidents which might affect power production such as stops and starts and maintenance operations is selected.

The following selection criteria are used:
  Selection of control groups: those groups with lower variability are the only ones taken into account when estimating the output of the wind turbine.
  Selection of the time frames over which the wind turbine output will be calculated.

If, for a given group, the variability of the data after normalising with respect to its central point is very high, the processing of the data in the subgroup adds considerable noise to the output estimation method. That is the reason why for this method those groups whose variability falls within a determined range are only taken into account.

For a group of data to be taken into account under the method of control it is considered that it must contain more than 30 data points and, further, its variability must be less than 30%.

On the other hand, the method needs to analyse a set of data, so that it is necessary to take into account production data over a determined time period, which may well be defined by the total number of data points and the number of valid data points. That way the shorter the time period the quicker a result is obtained, but in general the more the uncertainty over the estimate obtained. Accordingly, the output estimation over a number of timeframes is needed, based on which it can be determined if the wind turbine is operating correctly. Preferably three timeframes defined by a number of control data items between 100 and 20,000 would be used.

b) Grouping (63) of the data points (61) for study in the separate control subgroups (65).

c) Obtaining the characteristic power for each of the data points (61), using the function $f_{g-j}$ for each control group (j).

d) Calculating the variability of the actual power data (69) with respect to the characteristic power which allows the obtaining of the variability of each data subgroup (69) for each period of study. From the variability data for each subgroup and preferably using calibration techniques for the measurement equipment the estimate of output (73) of the wind turbine for each timeframe under consideration is obtained (71).

Three alarm levels are determined as a function of the deviation from mean output as evaluated in different timeframes. To determine the alarm thresholds a statistical evaluation of the probability of failure as a function of the above-mentioned output deviation is carried out. Preferably probability of failure thresholds of 75%, 95% and 99% is used.

If at any time an anomalous variation in production is detected in any of the wind turbines the control system generates the relevant alarms and warnings.

The output estimation processes and determination of the operating characteristics of the wind turbines in the wind farm must be carried out periodically. Preferably these should be carried out every 10 minutes, that is, every time the system receives a new data item from one of the wind turbines. Other valid timeframes might be between 10 minutes and 1 hour.

Table 4 shows an example of the final results obtained using the method addressed in this invention.

TABLE 4

| Datum | P [kW] | V [m/s] | $\sigma_V$ [m/s] | α [°] | β [°] | Pa [mmHg] | T [K] | $H_r$ [mmHg] |
|---|---|---|---|---|---|---|---|---|
| 4000 | 233 | 6.28 | 1.38 | −2.15 | 295.00 | 821.24 | 279.11 | 90.00 |
| 4010 | 169 | 5.87 | 1.65 | −2.15 | 301.00 | 821.38 | 279.11 | 91.00 |
| 4020 | 219 | 6.46 | 1.75 | −2.05 | 298.00 | 821.36 | 279.31 | 92.00 |
| 4030 | 114 | 4.90 | 1.10 | −2.12 | 299.00 | 821.42 | 279.31 | 92.00 |
| ... | | | | | | | | |
| 4500 | 139 | 5.60 | 1.01 | −1.83 | 335.00 | 829.38 | 289.08 | 85.00 |
| 4510 | 82 | 4.80 | 1.01 | −1.76 | 345.00 | 829.52 | 289.76 | 86.00 |
| 4520 | 95 | 4.97 | 1.02 | −1.72 | 354.00 | 829.52 | 288.49 | 87.00 |

| Datum | $P_r$ [kW] | $D_{cor300}$ [%] | $D_{cor1000}$ [%] | $D_{cor1000}$ [%] |
|---|---|---|---|---|
| 4000 | 232.18 | −6.32% | −2.39% | −0.76% |
| 4010 | 167.36 | −6.38% | −2.41% | −0.77% |
| 4020 | 218.67 | −6.48% | −2.44% | −0.77% |
| 4030 | 111.53 | −6.46% | −2.42% | −0.76% |
| ... | | | | |
| 4500 | 145.36 | 2.19% | −1.31% | −0.19% |
| 4510 | 89.71 | 2.12% | −1.30% | −0.19% |
| 4520 | 102.04 | 2.09% | −1.28% | −0.19% |

Each of the rows of the first part of Table 4 shows the values of the indicated variables received by the relevant means of measurement at a given time interval (every 10 minutes). The entire series of data are not shown but only an extract of the data points numbered 4000 to 4520.

Each of the rows of the second part of Table 4 shows the value of the power Pr actually produced corresponding to the data point in question and the mean deviations $D_{cor300}$, $D_{cor1000}$, $D_{cor4000}$ between power values Pr actually produced and the characteristic power values Pc corresponding to the same values of the meteorological parameters (obtained using the function determined from the calculation module (23) corresponding to the wind turbine characterisation process) for groups of the final 300, 1000 and 4000 data points in the series. Then, for each data point in the series under consideration, both the value of the power Pr actually produced (for example Pr=111.53 for data point no. 4030) and the mean deviation with respect to the characteristic power Pc for the groups from the final 300, 1000 and 4000 data points (−6.46%, −2.42%, −0.76%) are provided.

It can be clearly seen that the difference between the values for the power actually produced Pr and that deduced from the characteristic power Pc, is smaller the larger the group of data under consideration is and that, in all cases, even with the group of 300 data points a band of deviation is obtained which is sufficiently narrow to consider to be an anomaly when a deviation outside the band is detected.

As indicated above, in a preferred embodiment of this invention the second calculation module (25) includes a sub-module (27) connected to the control system of the wind turbine (3) to transmit to it directly the instructions resulting from the above-mentioned evaluation of the power of the wind turbine in particular circumstances such as the following.

a) If a reduction in output is detected which is greater than a previously established amount, the second calculation module sends a signal to the control system of the wind turbine (3) in a preventive manner to avoid possible more significant damage.

b) If, as is the case with a majority of wind turbines currently being installed, the wind turbine (3) has a main and an auxiliary pairing of anemometer and vane, the system evaluates the production of the wind turbine from the data supplied by these two pairs of instruments, that is the same calculations are carried out in duplicate.

If using the data provided by the principal anemometer/vane pair a greater than expected output is detected then the following occurs:

If the result obtained from the data supplied by the auxiliary instrument pair does not confirm the greater output, but rather shows the output to be in line with expectations, this means that one of the components of the principal instrument pair is not functioning correctly and the control system of the wind turbine (3) is instructed to use the data from the auxiliary pair.

If both results are in agreement the relevant alarm is generated.

As will be well understood by an expert in this area, the evaluation unit (21) of the system for the evaluation and control of wind turbines addressed in this invention can be located either in a control centre located at the wind farm (1) or at a remote centre and can evaluate and control a large number of wind turbines and, in particular, the totality of the wind turbines at a wind farm.

Although this invention has been described entirely in terms of preferred embodiments, it is clear that modifications within their scope can be introduced, not regarding this as limited by previous embodiments, rather by the contents of the following claims.

The invention claimed is:

1. A system for the evaluation and control of the output of at least one wind turbine (3) located in a wind farm (1), the wind turbine (3) having a system for the control of its components which includes some first means of measurement (11) of some meteorological parameters M1 situated in the wind turbine (3) and some second means of measurement (13) of the direction of orientation β of the wind turbine (3) and the power Pr actually produced by the wind turbine (3), the wind farm (1) having some third means of measurement (15) of some meteorological parameters M2 located in a meteorological tower (5) situated in the same wind farm (1), characterised because it consists of a computerised unit (21) connected to the above-mentioned first, second and third means of measurement (11, 13, 15) which include:

a) a first calculation module (23) which obtains the characteristic power Pc of the wind turbine (3) as a function of at least the meteorological parameters M1 and M2 and the direction of orientation β of the wind turbine (3), from the data provided periodically by the first, second and third means of measurement (11, 13, 15) during a first stage of operation of the wind turbine (3);

b) a second calculation module (25) which from the data provided periodically by the above-mentioned first, second and third means of measurement (11, 13, 15) during the normal operation of the wind turbine (3) obtains the mean deviation Dm between the power Pr actually produced by the wind turbine (3) and the characteristic power Pc corresponding to the values of the parameters M1 and M2 and the direction of orientation β of the wind turbine (3) provided jointly with the value of the power Pr, applying the function obtained with the first calculation module (23), in a set of one or more series of data corresponding to a predetermined number of periods.

2. A system for the evaluation and control of the output of at least one wind turbine (3) in accordance with claim 1, characterised because the meteorological parameters M1 comprise at least wind velocity v and direction α and/or statistical parameters derived from them and the meteorological parameters M2 comprise at least air pressure Pa, temperature T and relative humidity Hr and/or statistical parameters derived from them.

3. A system for the evaluation and control of the output of at least one wind turbine (3) in accordance with claim 1, characterised in that in the first calculation module (23) the characteristic power Pc is obtained as a discrete function in relation to predetermined intervals of the meteorological parameters M1 and M2 and the direction of orientation b of the wind turbine.

4. A system for the evaluation and control of the output of at least one wind turbine (3) in accordance with claim 1, characterised because the first stage of operation of the computer in which the characteristic power Pc is obtained as a function of at least the meteorological parameters M1 and M2 and the direction of orientation β of the wind turbine (3) terminates when a representative data for a pre-established subset of intervals of the velocity v and the wind direction α based on historic data for the wind farm (1) have been obtained.

5. A system for the evaluation and control of the output of at least one wind turbine (3) in accordance with claim 1, characterised because the periodicity of the data provided by the above-mentioned first, second and third means of measurement (11, 13, 15) falls between 10 and 60 minutes.

6. A system for the evaluation and control of the output of at least one wind turbine (3) in accordance with claim 1, characterised because the minimum series of data to obtain the above-mentioned mean deviation Dm covers 100 periods.

7. A system for the evaluation and control of the output of at least one wind turbine (3) in accordance with claim 1, characterised because mean deviations Dm for three series of at least 300, 1000 and 4000 periods are obtained.

8. A system for the evaluation and control of the output of at least one wind turbine (3) in accordance with claim 1, characterised because the above-mentioned second calculation module (25) includes a sub-module (27) connected to the control system of the wind turbine (3) to transmit to it instructions to be executed by the above-mentioned control system in the event that the mean deviation Dm of one of the above-mentioned series exceeds certain pre-established thresholds.

9. A system for the evaluation and control of the output of at least one wind turbine (3) in accordance with claim 1, characterised because the above-mentioned first means of measurement (11) comprise some principal and some duplicate auxiliary means and because the second calculation module (25) comprises some additional means for obtaining the above-mentioned mean deviation Dm from the data provided by the meteorological parameters M1 both by the above-mentioned principal means and by the above-mentioned auxiliary means for the purpose of detecting any failures in these on obtaining discrepancies between the results.

* * * * *

UNITED STATES PATENT AND TRADEMARK OFFICE
CERTIFICATE OF CORRECTION

PATENT NO.       : 8,604,633 B2
APPLICATION NO. : 12/937406
DATED            : December 10, 2013
INVENTOR(S)      : Llombart Estopiñan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this
Twenty-third Day of May, 2017

Michelle K. Lee
*Director of the United States Patent and Trademark Office*